(No Model.) 2 Sheets—Sheet 1.

J. K. HALLOWELL.
DUST COLLECTOR.

No. 447,026. Patented Feb. 24, 1891.

Witnesses:
Chas. E. Gaylord,
Clifford N. White.

Inventor:
John K. Hallowell,
By Dyrenforth & Dyrenforth,
Attys.

(No Model.) 2 Sheets—Sheet 2.

J. K. HALLOWELL.
DUST COLLECTOR.

No. 447,026. Patented Feb. 24, 1891.

Witnesses:

Inventor:
John K. Hallowell

UNITED STATES PATENT OFFICE.

JOHN K. HALLOWELL, OF CAMDEN, NEW JERSEY.

DUST-COLLECTOR.

SPECIFICATION forming part of Letters Patent No. 447,026, dated February 24, 1891.

Application filed June 11, 1888. Serial No. 276,754. (No model.)

*To all whom it may concern:*

Be it known that I, JOHN K. HALLOWELL, of Camden, in the county of Camden and State of New Jersey, have invented certain new and useful Improvements in Dust-Collectors, of which the following is a specification.

My invention relates to an improvement in the class of apparatus for collecting the dust, fines, or finely-comminuted material produced in various industries—say as the product of ore or analogous pulverization, or as a residue from wood-working, middlings-purifying, and the like machinery—in which the work performed entails the production of dust, which it is desirable to get rid of, to remove it as much and as rapidly as possible, thereby to reduce the quantity in the surrounding atmosphere inhaled by the workers or to save it for its value, or both.

More definitely stated, my improvement relates to the class of dust-collectors wherein the dust-laden air is directed by air-blasts from the place wherein it arises into an inclosure, where it is thoroughly sifted on its way to the ultimate escape-outlet, thereby intercepting the dust from the air, which escapes in a purified condition, while the dust is confined and collected.

The objects of my invention are to provide a simply-constructed apparatus involving a comparatively small cost for its erection, but which shall be thoroughly effective in its purpose, and in the operation of which there shall be no necessity for the exposure of the operator or operators to the dust.

My invention consists in the general construction of my improved apparatus; and it also consists in details of construction and combinations of parts, all as hereinafter more fully set forth and claimed.

Figure 1:
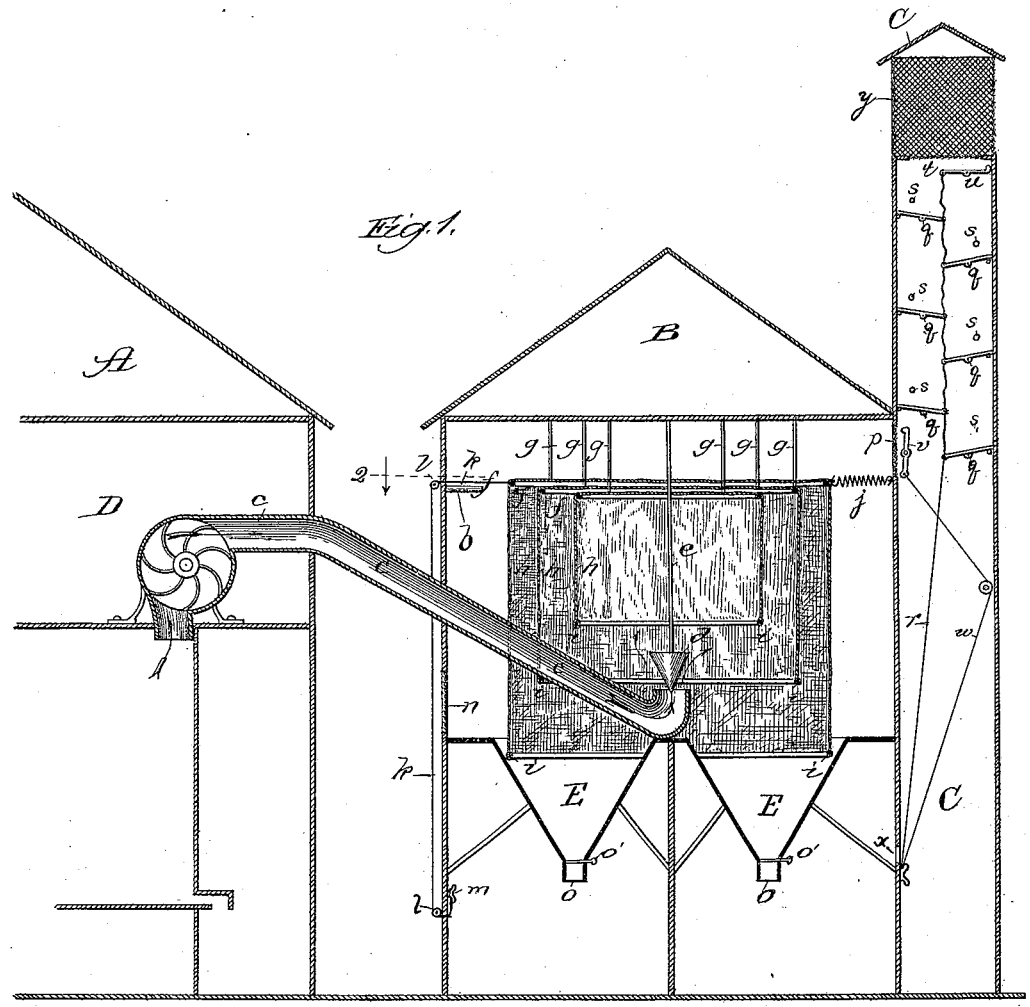
Figure 2:
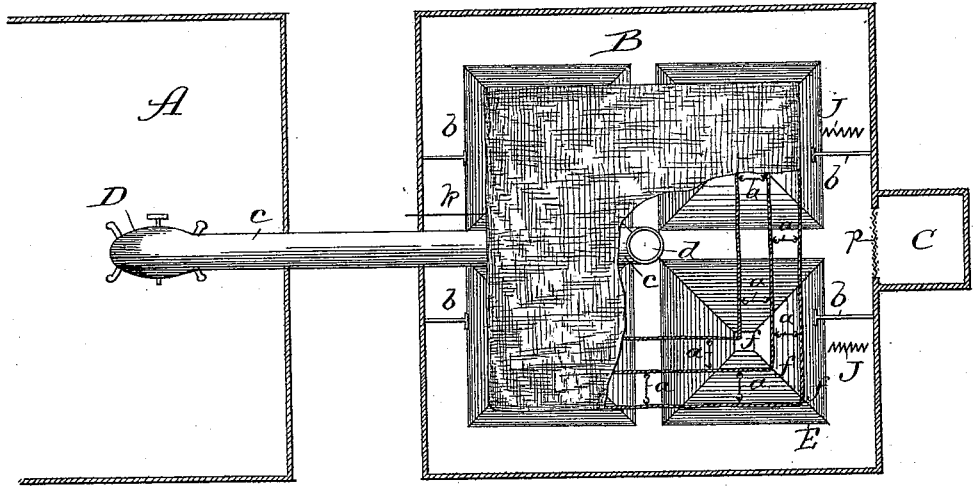

In the accompanying drawings, Figure 1 shows a longitudinal vertical section of my improved apparatus. Fig. 2 is a broken horizontal section taken at the line 2 of Fig. 1 and viewed in the direction of the arrow; and Fig. 3, a horizontal sectional view through the sifting-chamber at the hoppers, forming the base thereof and leading into the hopper or collecting-chamber below.

Generally described, my improvement involves as its essential parts, in combination with the inclosure to be relieved of the dust-laden atmosphere, an exhaust-fan or equivalent mechanism, a sifting-chamber having an escape-outlet and into which the dust-laden air is directed and therein forced in an upward direction through the sifting appliance, and below the sifting-chamber a collecting-chamber communicating with the sifting-chamber. These may be all parts of the same inclosure or building, as different floors thereof or compartments therein, though in Fig. 1 of the drawings the representation is of one building from which the supply of dust-laden air is taken and forced into another building containing the sifting appliance in the upper part above the collecting-compartment and having a tower for the ultimate outlet.

Following is a detailed description of the apparatus as illustrated.

A building A or any other suitable inclosure contains an exhaust-fan D, communicating from its inlet end with the portion of the said inclosure to be relieved of dust-ladened air. From its discharge end the fan D communicates through a conduit *c* with an inclosure or building B, terminating therein with its mouth extending upward, as shown, and having suspended in inverted position over it, by a rod *e* or other suitable means from the upper part of the inclosure, a cone *d*, the apex of which is presented to the mouth of the conduit, and by preference centrally thereof. The cone *d* should be sufficiently heavy to resist the force of the blasts directed against it, as hereinafter described, from the conduit and tending to displace it by swinging, and to that end it may be formed hollow of metal, and adequately weighted by filling with suitable material, as with sand.

In the upper part of the inclosure B are suspended from the ceiling, as by hook-rods *g*, frames *f*, three of which are shown, though they may be provided in any desired number. The frames, which I prefer to have square, may be formed with ordinary gas-pipe as a conveniently-applied and desirably-cheap material, they being of relative dimensions that would enable them to fit one within the other, and they may be supported, as shown, at different elevations, but as nearly as practicable on the same plane, with the innermost lowest and the others successively higher.

Over each suspended frame $f$ is adjusted a filtering-cloth $h$ of suitable texture or mesh, which should decrease in size from the innermost to the outermost, the cloths being preferably graduated in length, as shown, and weighted at their lower edges, as by means of iron rods $i$, the suspended cloths on their frames presenting the appearance of several concentric cloth-rooms, each closed on all sides except the base, and coinciding at their common center with the mouth of the conduit $c$, which passes through one side of each or of several of the outer ones, and is enveloped at its mouth by them, as shown.

Figure 3:
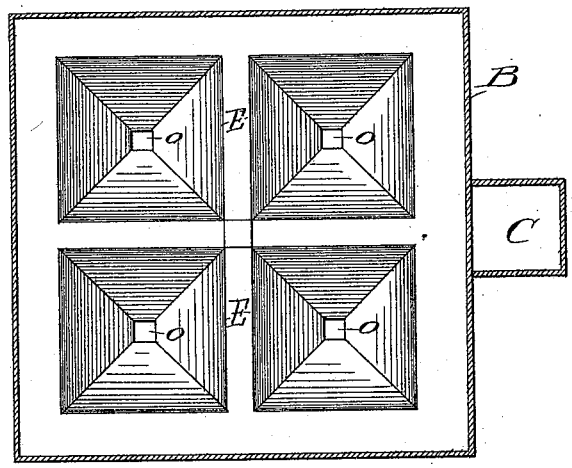

Below the cloths $h$ the inclosure B is divided horizontally by a series of hoppers E, as shown in Fig. 1 and represented in Fig. 3, the hoppers being suitably supported and properly braced, as indicated, and all leading at their contracted or discharge ends $o$, which should be provided with slide-valves $o'$, into the lower compartment divided off by them in the building B and affording the dust-collecting chamber. The outermost frame $f$ is connected with a side of the inclosure B by means of a spring or springs $j$, and to the opposite side of that frame is secured one end of a rope $k$, or the like, leading thence outside the adjacent wall and down along the same over pulleys $l$ and back at its lower end into the aforesaid collecting-chamber, being therein loosely attached at $m$. At the two said opposite sides of the outermost frame, and extending into the plane thereof from the corresponding walls of the inclosure, are bumpers $b$, and the frames $f$ should be interconnected, as by the hook rods or links $a$.

Access from without the building B may be had to the sifting-room therein or compartment containing the cloth-covered frames $f$ through a door $n$.

At one side of the inclosure B is a tower C, communicating with the sifting-chamber from above the frame $f$ therein through a screen or cloth-covered outlet-opening $p$, at which is supported a pivotal knocker $v$, operated through the medium of a rope $w$, secured at its lower end near an opening $x$ in a side of the collecting-chamber and through which it is accessible. Within the tower, from near the opening $p$ upward, are provided, to alternate with each other on opposite sides, shelves $q$, which may be formed of sheet metal, and are pivotally supported to incline toward the vertical center of the tower on rods, to which they are hinged nearer their inner than their outer edges, all being controlled through the medium of a rope $r$ or the like, secured to the outer edge of each shelf and leading downward to the place of securing the rope $w$, where it is accessible like the latter. Above each hinged shelf $q$ is a stop-rod $s$, and the upper end of the rope $r$ is fastened to an end of a pivotal knocker $u$, the opposite end or head of which is adapted to strike a screen $t$, covering the tower near its upper end, where it should be protected by wire-netting $y$ against the entrance of birds and the like or the accumulation of foreign matter on the screen $t$.

The operation is as follows: By actuating the exhaust-fan D, dust-laden air from the inclosure A is forced through the conduit $c$ into the sifting-chamber in an upward direction against the inverted cone $d$, which spreads or radiates it in all directions, causing an even distribution of the solid particles blown into the sifting-chamber by the air-currents. This forces the dust-laden air against the inner sides of the walls of the suspended cloth-chambers, through which it is thoroughly sifted, and from the outermost of which whatever of the extremely fine particles pass through it will be intercepted by the screen or cloth $p$, and further on by the screen $t$ in the tower, the matter reaching the tower lodging on the shelves $q$, whence it may be dropped into the base of the tower on pulling the rope $r$ to tilt the shelves, whereby at the same time and by the same operation the knocker $u$ is struck against the screen $t$ to dislodge the material it may hold. For the same purpose the screen $p$ may be struck by the knocker $v$, actuated by pulling the rope $w$, and the frames $f$ may be vibrated against the bumpers $b$ by pulling on the rope $k$ and the resilient force of the springs $j$. All the intercepted material from the sifting-chamber is thus dropped into the hoppers, from which it may, from time to time, be emptied into the collecting-chamber below them.

What I claim as new, and desire to secure by Letters Patent, is—

1. In a dust-collector, the combination, with an inclosure A, of an exhaust-fan D, communicating with the said inclosure, an inclosure B, containing a series of hoppers E, dividing it into an upper sifting-chamber provided with an escape-outlet and a lower collecting-chamber into which the hoppers lead, a conduit $c$, leading from the exhaust-fan into the sifting-chamber above the plane of the hoppers and discharging therein in an upward direction, and a series of cloth-covered frames $f$, suspended in the sifting-chamber over the mouth of the conduit $c$, substantially as described.

2. In a dust-collector, the combination, with an inclosure A, of an exhaust-fan D, communicating with the said inclosure, an inclosure B, containing a series of hoppers E, dividing it into an upper sifting-chamber and a lower collecting-chamber into which the hoppers lead, a conduit $c$, leading from the exhaust-fan into the sifting-chamber above the plane of the hoppers and discharging therein in an upward direction, a series of cloth-covered connected frames $f$, suspended in the sifting-chamber over the mouth of the conduit $c$, and a tower C, communicating with the sifting-chamber and containing a top screen $t$, substantially as described.

3. In a dust-collector, the combination, with an inclosure A, of an exhaust-fan D, an inclosure B, containing a series of hoppers E, dividing it into an upper chamber and a lower collecting-chamber into which the hoppers lead, a conduit c, bent upward at its discharge end, a cone d, suspended over the discharge end of the conduit, and the concentric series of filtering-cloths h, graduated in length, substantially as and for the purpose set forth.

4. A dust-collector comprising, in combination with an inclosure A, an exhaust-fan D, communicating with the said inclosure, an inclosure B, containing hoppers E, dividing it into an upper sifting-chamber and a lower collecting-chamber, a conduit c, leading from the exhaust-fan into the sifting-chamber near its base and discharging therein in an upward direction, a series of connected cloth-covered spring-controlled frames f, suspended in the sifting-chamber over the mouth of the conduit c, one or more bumpers for the frames, a cone d, suspended in inverted position over the mouth of the conduit, and a screen-covered tower C, communicating through a screen-covered opening with the sifting-chamber and containing a knocker u and alternating hinged shelves connected together and with the knocker, and a knocker v for the said screen-covered opening, the whole being constructed and arranged to operate substantially as described.

JOHN K. HALLOWELL.

Witnesses:
CHAS. W. PILE,
F. G. FAROR.